United States Patent [19]

Sajbel et al.

[11] Patent Number: 5,447,602
[45] Date of Patent: Sep. 5, 1995

[54] PROCESS FOR REPULPING WET-STRENGTH PAPER

[75] Inventors: Jerome S. Sajbel, Ft. Mill, S.C.; James R. Heyward, Jr., Charlotte, N.C.; Share, Berwyn; Stephen A. Fischer, Yardley, both of Pa.

[73] Assignee: Henkel Corporation, Plymouth Meeting, Pa.

[21] Appl. No.: 112,779

[22] Filed: Aug. 26, 1993

[51] Int. Cl.⁶ ............................................. D21C 5/02
[52] U.S. Cl. ................................ 162/6; 162/78; 162/79
[58] Field of Search ................. 162/6, 4, 5, 8, 78, 162/79

[56] References Cited

U.S. PATENT DOCUMENTS

| | | | |
|---|---|---|---|
| 3,645,840 | 2/1972 | Lincoln et al. | 162/78 |
| 3,709,778 | 1/1973 | Lincoln et al. | 162/71 |
| 4,454,005 | 6/1984 | Stofko et al. | 162/71 |
| 4,617,090 | 10/1986 | Chum et al. | 204/79 |
| 5,246,543 | 9/1993 | Meier et al. | 162/65 |

OTHER PUBLICATIONS

Rydholm Pulping Processes, 1965 pp. 886 893 894.

*Primary Examiner*—W. Gary Jones
*Assistant Examiner*—Mark De Simone
*Attorney, Agent, or Firm*—Ernest G. Szoke; Wayne C. Jaschke; Real J. Grandmaison

[57] ABSTRACT

A process for repulping wet-strength paper containing at least one wet-strength resin in which a hydroperoxide alone or in combination with a non-alkali, non-alkaline earth metal salt or chelate is used to separate the resin from the wet-strength paper.

22 Claims, No Drawings

PROCESS FOR REPULPING WET-STRENGTH PAPER

BACKGROUND

1.0. Field of the Invention

The present invention is generally directed to a process for repulping wet-strength paper in which a peroxide compound alone or in combination with a select group of metal salts or chelates oxidizes polymeric resins in the wet-strength paper.

2.0. Discussion of Related Art

Wet-strength paper contains a resin which is adsorbed onto paper fibers during the paper making process and cross-links on heating or aging of the paper to form a polymeric network which adds strength to the paper. Wet-strength resins fall into two groups, permanent and temporary and include formaldehyde-based resins, amine-epichlorohydrin based resins and aldehyde polymers.

In order to repulp wet-strength paper, it is necessary to hydrolyze the cured resin. For many years metal hypochlorites (e.g. sodium and potassium hypochlorite) have been used as reagents for repulping wet-strength paper as shown by, for example, C. S. Maxwell, U.S. Pat. No. 3,407,113 and H. R. Miller, U.S. Pat. No. 3,427,217.

Hypochlorites generate adsorbable organic halides in paper mill effluents. These substances are environmentally undesirable. Accordingly, the papermaking industry has sought to use non-chlorinated reagents for repulping wet-strength paper.

Alkali metal persulfates ($M_2S_2O_8$) and monopersulfates ($MHSO_5$) have recently been used as reagents to replace hypochlorites. H. H. Espy et al "Persulfates as Repulping Reagents for Neutral/Alkaline Wet-strength Broke" *Tappi Journal* Vol. 76, No. 2, pp. 139–141 (February, 1993) show significant reductions in organic chlorides using persulfates as the oxidizing agent.

However, there is a continuing need to develop repulping reagents that are environmentally acceptable and which are effective in repulping wet-strength paper during the repulping operation.

3.0. Summary of the Invention

The present invention is generally directed to a process for repulping wet-strength paper in which a non-chlorinated reagent is used to oxidize the wet-strength resin in the wet-strength paper.

In particular, the present invention is directed to a process for repulping wet-strength paper comprising adding at least one peroxide compound alone or in combination with a non-alkali, non-alkaline earth metal salt or metal chelate to thereby oxidize the wet-strength resin in the wet-strength paper to form paper fibers.

DETAILED DESCRIPTION OF THE INVENTION

The present invention provides for the repulping of wet-strength paper using, as an oxidizing reagent, at least one peroxide compound alone or in combination with a non-alkali, non-alkaline earth metal salt or metal chelate. In accordance with the invention, the oxidizing reagent effectively oxidizes the wet-strength resin in the wet-strength paper without producing environmentally objectionable by-products such as occurs when using hypochlorites.

The peroxide compounds employed in the present invention are selected from those having the formula $(HOO)_nR$ wherein R is selected from hydrogen, a straight or branched chain alkyl group having 1 to 10 carbon atoms, an aryl group which may be substituted with an alkyl group, or a terminal carboxyl radical, and where n is 1 or 2. The preferred peroxide compounds are selected from the group consisting of hydrogen peroxide, peracetic acid, tert. butyl hydroperoxide, tert. amyl hydroperoxide, cumene hydroperoxide, and 2,5-dihydroperoxy-2,5-dimethylhexane. The most preferred peroxide compounds are hydrogen peroxide and peracetic acid.

The amount of the peroxide compound employed in the present invention is at least 0.1% w/w based on the dry weight of the dry fiber in the slurry. It is preferred to have a concentration of the peroxide compound of at least 2.5% w/w of the dry fiber in the slurry, most preferably in the range of from about 2.5 to 5.0% w/w of the dry fiber in the slurry for bleached wet-strength paper. A somewhat greater amount of the hydroperoxide compound may be required if the wet-strength paper contains lignin (e.g. brown stock).

The metal salts which may optionally be used in combination with the peroxide compound are selected from metal salts wherein the metal is not an alkali metal (e.g. sodium and potassium) or an alkaline earth metal (e.g. calcium and magnesium). The preferred metals are selected from transition metals such as the group consisting of iron, copper, cobalt, nickel, manganese, silver, titanium, cerium, lead, chromium, vanadium, molybdenum, tungsten, chromium, osmium and selenium. The most preferred metal is iron.

The metal salts must be soluble in the aqueous slurry of the wet-strength paper. Accordingly, the metal salts employed in the present invention should be water-soluble or rendered water-soluble in the slurry. The metal salt may be rendered water-soluble in the slurry by adding a reducing agent. For example, ferric sulfate is substantially water-insoluble. However, if ferric sulfate is allowed to react with a reducing agent, such as, sodium formaldehyde sulfoxylate or sodium metabisulfite, ferric sulfate will be reduced to ferrous sulfate which is soluble in the aqueous slurry. Other suitable reducing agents for use in the present invention would be apparent to those skilled in the art. The preferred metal salts for use in the present invention include ferrous salts, such as, ferrous sulfate and ferrous ammonium sulfate.

A chelating agent may be used to convert the metal salt to a metal chelate. While any chelating agent may be used, the preferred chelating agents include, pentasodium diethylenetriaminepentaacetic acid, ethylenediaminetetraacetic acid (EDTA), tetrasodium EDTA, tetraammonium EDTA, disodium EDTA, diammonium EDTA, tetrasodium diethylenetriaminepentaacetic acid, and trisodium N-(hydroxyethyl)-ethylenediaminetriacetic acid, and triethanolamine. The preferred metal chelate is iron diethylenetriaminepentacetic acid.

The metal chelate may be added to the peroxide compound to form a reagent for oxidizing the wet-strength resin or may be formed in situ by the reaction of a metal salt (e.g. ferrous sulfate) and a chelating agent.

The amount of the metal salt or metal chelate which may be used in the process of the present invention is an amount sufficient to catalyze formation of alkoxy radicals in accordance with the following equation:

$$(HOO)_nR + m^x \rightarrow RO^\cdot + OH^- + m^{x+1}$$

wherein n=1 and x≧1. The alkoxy radicals break the resin bonds associated with the wet-strength paper. Generally, the amount of the metal salt is sufficient to provide the slurry of the wet-strength paper with up to about 10 ppm of the metal ion.

The repulping process is conducted by adding the peroxide compound alone or in combination with the metal salt or metal chelate to the aqueous slurry of the wet-strength paper. The repulping process is conducted at a temperature typically in the range of from about 25° to 100° C., preferably from about 50° to 80° C.

The pH of the slurry will vary depending on the type of wet-strength paper in the slurry. Generally, the pH of the slurry will be in the range of from about 3 to 13. A pH of about 7 to 11 is generally used for repulping bleached wet-strength paper while a pH spanning the entire range of from about 3 to 13 can be used to repulp unbleached wet-strength paper.

The process is preferably carried out for slurries having a concentration of wet-strength paper in the range of from about 1 to 15% by weight, preferably about 3 to 6% by weight, most preferably about 5% by weight, regardless of the type of wet-strength paper which is to be repulped.

The present process may be applied to oxidize all classes of wet-strength resins from wet-strength paper. Generally, wet-strength resins fall into three classes: acid-curing permanent resins, neutral/alkaline-curing permanent resins and neutral/acid temporary resins. Urea and melamine-formaldehyde resins are exemplary of acid-curing permanent resins. Polyaminoamide-epichlorohydrin and polyamine-epichlorohydrin resins are examples of neutral/alkaline-curing permanent resins. Polyacrylamide-glyoxal resins are examples of neutral/acid-curing temporary resins. While the present process may be applied to remove all classes of these resins from wet-strength paper, particularly effective results are obtained when the wet-strength paper contains the neutral/alkaline-curing permanent resins of the polyaminoamide-epichlorohydrin or polyamine-epichlorohydrin type.

The three classes of wet-strength resins and their particular properties are known to those skilled in the art such as disclosed in Herbert H. Espy "The Chemistry of Wet-Strength Broke Repulping" *Progress in Paper Recycling* pp. 17–23 (August 1992).

The following examples are illustrative of embodiments of the invention and are not intended to limit the invention as encompassed by the claims forming part of the Application.

EXAMPLES 1-2

Example 1

Bleached milk carton paper board (40 grams) containing 0.4% polyaminoamide-epichlorohydrin (PAE) wet-strength resin was cut into 1"×1" pieces and a pulp slurry of about 2% consistency was prepared as described in Tappi Method T-205 om-88 section 7.1.1 by disintegrating for 2.5 minutes. The slurry was transferred to a 2 liter glass beaker, gentle stirring was applied, and the pH was adjusted to 11 with 1N NaOH, and heated to 70° C. Ferrous sulfate (0.02 gram) and 3.3 grams of a 30% hydrogen peroxide solution were added to the pulp slurry at 70° C. The temperature and pH were maintained for 32 minutes. A sample was removed for filtering in a Somerville Fractionator having a 0.15 mm slotted screen. Residuals were collected, dried overnight in an oven at 105° C. and reported as % repulped paper. Repulping data was summarized in Table 1.

Example 2

Example 1 was repeated except that 3.1 grams of a 32% solution of peracetic acid was added to the pulp slurry. The results are shown in Table 1.

COMPARATIVE EXAMPLES A-E

Comparative Example A

Using the general repulping method of Example 1, 40.0 grams of milk carton paper board were disintegrated for 2.5 minutes in 1,960 grams of water. The pulp slurry was transferred to a 2 liter beaker and the pH was adjusted to 11 with 1N NaOH before heating to 70° C. under gentle agitation. 1.0 gram of sodium persulfate was added and the temperature and pH were maintained at 70° C. and 11, respectively. After 90 minutes, 75% of the paper was repulped.

Comparative Example B

Comparative Example A was repeated, except that 1.0 gram of a triple salt having potassium mono-persulfate as the active material (Oxone; marketed by DuPont) was added to the pulp slurry. After 60 minutes, 93% of the paper was repulped.

Comparative Example C

Comparative Example A was repeated, except that 8.3 grams of a 12% solution of sodium hypochlorite was added to the pulp slurry and the pH was adjusted to 6.5 with 1N HCl. After 70 minutes, 98% of the paper was repulped.

Comparative Example D

Comparative Example A was repeated, except that 0.02 gram of ferrous sulfate was added prior to sodium persulfate. After 75 minutes, 92% of the paper was repulped

Comparative Example E

Comparative Example B was repeated, except that 0.02 gram of ferrous sulfate was added prior to Oxone. After 30 minutes, 85% of the paper was repulped.

A summary of Comparative Examples A-E is shown in Table 1.

TABLE 1

| Example | Additive | % Additive | pH | Time (Min.) | % Repulped |
|---|---|---|---|---|---|
| Example 1 | $H_2O_2$/Fe | 2.5 | 11 | 32 | 99.9 |
| Example 2 | $CH_3CO_3H$/Fe | 2.5 | 11 | 32 | 97 |
| Comparative A | NPS | 2.5 | 11 | 90 | 75 |
| Comparative B | MPS | 2.5 | 11 | 60 | 93 |
| Comparative C | NaOCl | 2.5 | 6.5 | 70 | 98 |
| Comparative D | NPS/Fe | 2.5 | 11 | 75 | 92 |
| Comparative E | MPS/Fe | 2.5 | 11 | 30 | 85 |

NPS = sodium persulfate
MPS = Oxone (DuPont) containing potassium monopersulfate
NaOCl = sodium hypochlorite
Fe = 2 ppm iron in solution from ferrous sulfate
$H_2O_2$ = hydrogen peroxide
$CH_3CO_3H$ = peracetic acid

EXAMPLES 3-9

Example 3

Using the general repulping method described in Example 1, 40.0 grams of milk carton paper board containing 0.4% PAE were disintegrated for 2.5 minutes in 1,960 grams of water. The pulp slurry was transferred to a 2-liter beaker and the pH was adjusted to 11 with 1N NaOH before heating to 70° C. under gentle agitation. 0.02 gram of ferrous sulfate followed by 3.3 grams of a 30% solution of hydrogen peroxide was added and the temperature and pH were maintained at 70° C. and 11, respectively. After 60 minutes, 91% of the paper was repulped as shown in Table 2.

Example 4

Example 3 was repeated, except that 0.02 gram ferrous sulfate followed by 6.6 grams of a 30% solution of hydrogen peroxide was added to the pulp slurry. After 60 minutes, 93% of the paper was repulped.

Example 5

Example 3 was repeated, except 0.05 that gram ferrous sulfate followed by 3.3 grams of a 30% solution of hydrogen peroxide was added to the pulp slurry. After 60 minutes, 92% of the paper was repulped.

Example 6

Example 3 was repeated, except the temperature was adjusted to 50° C. and 0.02 gram ferrous sulfate followed by 3.3 grams of a 30% solution of hydrogen peroxide was added to the pulp slurry. After 60 minutes, 92% of the paper was repulped.

Example 7

Example 3 was repeated, except that 3.3 grams of a 30% solution of hydrogen peroxide was added to the pulp slurry. After 60 minutes, 92% of the paper was repulped.

Example 8

Example 3 was repeated, except the temperature was adjusted to 35° C. and 0.02 gram ferrous sulfate followed by 3.3 grams of a 30% solution of hydrogen peroxide was added to the pulp slurry. After 60 minutes, 85% of the paper was repulped.

Example 9

Example 3 was repeated, except the pH of the pulp slurry was adjusted to 7 with 1N HCl, and 0.02 gram ferrous sulfate followed by 3.3 grams of a 30% solution of hydrogen peroxide was added to the pulp slurry. After 60 minutes, 99% of the paper was repulped.

A summary of Examples 3-9 is shown in Table 2.

COMPARATIVE EXAMPLES F-H

Comparative Example F

Using the general method of Example 3, 40.0 grams of milk carton paper board was disintegrated for 2.5 minutes in 1,960 grams of water. The pulp slurry was transferred to a 2 liter beaker and the pH was adjusted to 11 with 1N NaOH before heating to 70° C. under gentle agitation. 1.0 gram of sodium persulfate was added and the temperature and pH were maintained at 70° C. and 11, respectively. After 60 minutes, 71% of the paper was repulped.

Comparative Example G

Comparative Example F was repeated, except that 1.0 gram of a triple salt having potassium mono-persulfate as the active material (Oxone; marketed by DuPont) was added to the pulp slurry. After 60 minutes 78% of the paper was repulped.

Comparative Example H

Comparative Example F was repeated without a repulping additive and after 60 minutes, 76% of the paper was repulped.

A summary of comparative Examples F-H is shown in Table 2.

TABLE 2

| Example | Additive | % Additive | pH | Time (Min.) | % Repulped |
|---|---|---|---|---|---|
| Example 3 | $H_2O_2$/Fe | 2.5 | 11 | 60 | 91 |
| Example 4 | $H_2O_2$/Fe | 5.0 | 11 | 60 | 93 |
| Example 5 | $H_2O_2$/Fe* | 2.5 | 11 | 60 | 92 |
| Example 6** | $H_2O_2$/Fe | 2.5 | 11 | 60 | 92 |
| Example 7 | $H_2O_2$ | 2.5 | 11 | 60 | 92 |
| Example 8*** | $H_2O_2$/Fe | 2.5 | 11 | 60 | 85 |
| Example 9 | $H_2O_2$/Fe | 2.5 | 7 | 60 | 99 |
| Comparative F | NPS | 2.5 | 11 | 60 | 71 |
| Comparative G | MPS | 2.5 | 11 | 60 | 78 |
| Comparative H | None | — | 11 | 60 | 76 |

NPS = sodium persulfate
MPS = Oxone (DuPont) containing potassium monopersulfate
Fe = 2 ppm iron in solution from ferrous sulfate
$H_2O_2$ = hydrogen peroxide
*5 ppm iron in solution from ferrous sulfate
**reaction temperature is 50° C.
***reaction temperature is 35° C.

EXAMPLES 10-12

Example 10

Using the general repulping method of Example 1, 80.0 grams of bleached poster board containing 1.0% PAE was disintegrated for 10.0 minutes in 1,920 grams of water. The pulp slurry was transferred to a 2 liter beaker and the pH was adjusted to about 9 with 1N NaOH before heating to 70° C. under gentle agitation. 0.02 gram ferrous sulfate followed by 6.7 grams of a 30% solution of hydrogen peroxide was added to the pulp slurry and the temperature and pH were maintained at 70° C. and 9, respectively. After 75 minutes, 92% of the paper was repulped.

Example 11

Example 10 was repeated, except the pH was adjusted to about 11 with 1N NaOH and 0.02 gram ferrous sulfate followed by 6.7 grams of a 30% solution of hydrogen peroxide was added to the pulp slurry. After 55 minutes, 99% of the paper was repulped.

Example 12

Example 10 was repeated, except the pH was adjusted to about 11 with 1N NaOH and 3.4 grams of a 30% solution of hydrogen peroxide was added to the pulp slurry. After 75 minutes, 73% of the paper was repulped.

A summary of Examples 10-12 is shown in Table 3.

COMPARATIVE EXAMPLES I-K

Comparative Example I

The procedure of Example 10 was repeated except that 2.0 grams of a triple salt having potassium monopersulfate as the active material (Oxone; marketed by DuPont DuPont) was added to the pulp slurry in place of ferrous sulfate and hydrogen peroxide. After 120 minutes, 57% of the paper was repulped.

Comparative Example J

Comparative Example I was repeated, except that 2.0 grams of sodium persulfate were added after the reaction temperature reached 70° C. and another 2.0 grams was added after minutes followed by 1.6 grams after 60 minutes for a total charge of 5.7 grams. After 210 minutes, 99.8% of the paper was repulped.

Comparative Example K

Comparative Example I was repeated without a repulping additive and after 120 minutes, 51% of the paper was repulped.

A summary of Comparative Examples I-K is shown in Table 3.

TABLE 3

| Example | Additive | % Additive | pH | Time (Min.) | % Repulped |
|---|---|---|---|---|---|
| Example 10 | H$_2$O$_2$/Fe | 2.5 | 9 | 75 | 92 |
| Example 11 | H$_2$O$_2$/Fe | 2.5 | 11 | 55 | 99 |
| Example 12 | H$_2$O$_2$/Fe | 2.5 | 11 | 75 | 73 |
| Comparative I | MPS | 1.3 | 12 | 180 | 72 |
| Comparative J | NPS | 7.1 | 12 | 210 | 99.8 |
| Comparative K | None | — | 12 | 120 | 51 |

NPS = sodium persulfate
MPS = Oxone (DuPont) containing potassium monopersulfate
Fe = 2 ppm iron in solution from ferrous sulfate
H$_2$O$_2$ = hydrogen peroxide

EXAMPLES 13–18

Example 13

Using the general repulping method of Example 1, 40.0 grams of unbleached liner board containing PAE was disintegrated for 5.0 minutes in 1,960 grams of water. The pulp slurry was transferred to a 2 liter beaker and the pH was adjusted to about 4 with 1N HCl before heating to 70° C. under gentle agitation. 0.02 gram of ferrous sulfate and 6.7 grams of a 30% solution of hydrogen peroxide was added to the pulp slurry and the temperature was maintained at 70° C. After 120 minutes, 72% of the paper was repulped.

Example 14

Example 13 was repeated, except the pH was adjusted to 4 with 1N HCl and 0.02 gram of ferrous sulfate and 6.7 grams of a 30% solution of hydrogen peroxide were added at 70° C. After 60 minutes, the pH was adjusted to about 11 with 1N NaOH and 6.7 grams of 30% hydrogen peroxide were added to the pulp slurry. After 120 minutes, 82% of the paper was repulped.

Preparation of Iron Chelate Complex

An iron chelate complex was prepared in the following manner. 1.0 gram of iron sulfate, hydrated with 7 moles of water, was dissolved in 97.5 grams of water. 4.5 grams of an aqueous solution of pentasodium salt of diethylenetriaminepentaacetic acid was added to the iron sulfate solution and the pH was adjusted to 3.6 with 0.7 gram of hydrochloric acid (37% solution). The resulting solution contained 1920 parts per million of chelated iron.

Example 15

Example 14 was repeated, except the pH was adjusted to about 4 with 1N HCl and 4.0 grams of chelated ferrous sulfate prepared as described above was added. The slurry was heated to 70° C. and a total of 12.0 grams of 30% hydrogen peroxide was added in 15 minute intervals over a 60 minute period. The pH was adjusted to about 11 with 1N NaOH and after 60 minutes, 81% of the paper was pulped.

Example 16

Examples 16–18 were conducted to treat unbleached liner board containing polyamine-epichlorohydrin resin.

Example 16 was otherwise a repeat of Example 13. After 120 minutes, 82% of the paper was repulped.

Example 17

Example 17 was otherwise a repeat of Example 14. After minutes, 89% of the paper was repulped.

Example 18

Example 18 was otherwise a repeat of Example 14 except the pH was adjusted to about 4 with 1N HCl and 0.02 grams ferrous sulfate was added. The slurry was heated to 70° C. and a total of 12.0 grams of a 30% hydrogen peroxide solution was added in 15 minute intervals over a 60 minute period. The pH was adjusted to about 11 with 1N NaOH and after 60 minutes, 93% of the paper was repulped.

A summary of Examples 13–18 is shown in Table 4.

COMPARATIVE EXAMPLES L–O

Comparative Example L

The procedure of Example 13 was repeated as Comparative Example L except that 2.0 grams of a triple salt having potassium monopersulfate as the active material (Oxone; marketed by DuPont) were added to the pulp slurry in place of ferrous sulfate and hydrogen peroxide. The temperature and pH were maintained at about 70° C. and 11, respectively. After 120 minutes, 57% of the paper was repulped.

Comparative Example M

Comparative Example L was repeated except that 2.0 grams of sodium persulfate were added after the reaction temperature reached 70° C. After 120 minutes, 57% of the paper was repulped.

Comparative Example N

Comparative Example L was repeated, except that 17.0 grams of a 12% solution of sodium hypochlorite were added after the reaction temperature reached about 70° C. After 120 minutes, 61% of the paper was repulped.

Comparative Example O

Comparative Example L was repeated, except that 6.0 grams of a 50% NaOH solution was added after the reaction temperature reached 70° C. After 120 minutes, 68% of the paper was repulped.

A summary of Comparative Examples L–O is shown in Table 4.

TABLE 4

| Example | Additive | % Additive | pH | Time (Min.) | % Repulped |
|---|---|---|---|---|---|
| Example 13** | H$_2$O$_2$/Fe | 5.0 | 4 | 120 | 72 |
| Example 14** | H$_2$O$_2$/Fe | 10.0 | * | 120 | 82 |
| Example 15** | H$_2$O$_2$/Fe- | 10.0 | * | 120 | 81 |

TABLE 4-continued

| Example | Additive | % Additive | pH | Time (Min.) | % Repulped |
|---|---|---|---|---|---|
| | chelate | | | | |
| Example 16*** | $H_2O_2$/Fe | 10.0 | 4 | 120 | 82 |
| Example 17*** | $H_2O_2$/Fe | 10.0 | * | 120 | 89 |
| Example 18*** | $H_2O_2$/Fe | 10.0 | * | 120 | 93 |
| Comparative L** | MPS | 5.0 | 11 | 120 | 57 |
| Comparative M** | NPS | 5.0 | 11 | 120 | 57 |
| Comparative N** | NaOCl | 5.0 | 11 | 120 | 61 |
| Comparative O** | NaOH | 7.5 | 11 | 120 | 68 |

NPS = sodium persulfate
MPS = Oxone (DuPont) containing potassium monopersulfate
NaOCl = sodium hypochlorite
Fe = 2 ppm iron in solution from ferrous sulfate
$H_2O_2$ = hydrogen peroxide
*pH at 4 for 60 min. and then adjusted to 11
**paper containing PAE resin
***paper containing polyamine-epichlorohydrin Example 19

Using the general repulping method of Example 1, 20.0 grams of a commercial polycoated orange juice container containing PAE resin were disintegrated for 5.0 minutes in 1,000 grams of water. The pulp slurry was transferred to a 2 liter beaker and heated to 60° C. under gentle agitation. 0.02 gram of ferrous sulfate and 1.7 grams of a 30% solution of hydrogen peroxide were added to the pulp slurry and the temperature was maintained at 60° C. After 75 minutes, the batch was filtered and the polycoat and paper residuals were separated and dried in an oven at 105° C. for 2 hours. 3.4 grams of polycoat and 2.9 grams of fiber were recovered. This was equivalent to 82.5% of the paper being repulped.

Examples 1–19 show that by employing an oxidizing agent in accordance with the present invention, the efficiency of repulping was generally excellent without the production of undesirable hypochlorites.

EXAMPLES 20–22

Example 20

40 grams of unbleached paper containing 1.0% PAE resin was cut into 1"×1" pieces and slurried in 1960 grams of water. The slurry was disintegrated for 15 minutes per the Tappi Method T-205 om-88 section 7.1.1. The amount of paper mechanically repulped was 47%. The pH of the slurry was adjusted to 4 with 1N HCl, heated to 70° C., and 0.02 grams of ferrous sulfate was added. Hydrogen peroxide (12 grams of a 30% solution) was added in 15 minute intervals over a 60 minute period. The pH was adjusted to 11 with 1N NaOH and after 60 minutes, 58% of the paper was repulped.

Example 21

40 grams of the same paper treated in Example 20 was cut into 1"×1" pieces and slurried in 1960 grams of water. The pH was adjusted to 4 with 1N HCl while heating the slurry to 70° C. 0.02 gram of ferrous sulfate was added followed by 13.2 grams of 30% hydrogen peroxide over a 60 minute period. The pH was adjusted to 11 with 1N NaOH and the slurry was mixed for another 60 minutes. The slurry was disintegrated for 3 minutes in the same manner as Example 20. The amount of paper repulped was 91%.

Example 22

40 grams of the same paper treated in Example 20 was cut into 1"×1" pieces and slurried in 1960 grams of water. The pH of the slurry was 8.2 and the slurry was heated to 70° C. 0.02 gram of ferrous sulfate was added followed by 13.2 grams of 30% hydrogen peroxide and the slurry was mixed for 30 minutes. The pH was adjusted to 11 with 1N HCl and mixed for another 30 minutes. The slurry was disintegrated for 3 minutes in the same manner as Example 20. The amount of paper repulped was 80%.

Examples 20–22 show that a greater amount of paper may be repulped when the resin containing paper was first treated with the oxidizing reagent of the present invention followed by mechanical disintegration of the paper.

What we claim is:

1. A process for repulping wet-strength paper containing at least one wet-strength resin comprising adding to a slurry of the wet-strength paper at least one peroxide compound and a catalytically effective amount of a non-alkali, non-alkaline earth metal salt which is soluble in the slurry to thereby oxidize the wet-strength resin during the repulping of the paper to form paper fibers.

2. The process of claim 1 wherein the peroxide compound has the formula $(HOO)_nR$ wherein R is selected from the group consisting of hydrogen, a straight or branched chain alkyl group having 1 to 10 carbon atoms, an aryl group which may be substituted with an alkyl group, or a terminal carboxyl radical, and n is 1 or 2.

3. The process of claim 2 wherein the peroxide compound is selected from the group consisting of hydrogen peroxide, peracetic acid, tert. butyl hydroperoxide, tert. amyl hydroperoxide, cumene hydroperoxide and 2-5 dihydroperoxy-2,5dimethylhexane.

4. The process of claim 3 wherein the peroxide compound is hydrogen peroxide.

5. The process of claim 3 wherein the peroxide compound is peracetic acid.

6. The process of claim 1 wherein the amount of the peroxide compound is at least 0.1% w/w of the dry fiber in the slurry.

7. The process of claim 6 wherein the amount of the peroxide compound is at least 2.5% w/w of the dry fiber in the slurry.

8. The process of claim 7 wherein the amount of the peroxide compound is from about 2.5 to 5.0% w/w of the dry fiber in the slurry and the paper is a bleached paper.

9. The process of claim 1 wherein the wet-strength resin is at least one resin selected from the group consisting of acid-curing permanent resins, neutral/alkaline-curing permanent resins and neutral/acid-curing temporary resins.

10. The process of claim 9 wherein the wet-strength resin is selected from the group consisting of a polyaminoamideepichlorohydrin resin and a polyamine-epichlorohydrin resin.

11. The process of claim 1 wherein the amount of the metal salt is sufficient to provide up to about 10 ppm of metal ion in the slurry.

12. The process of claim 1 comprising adding a catalytically effective amount of a non-alkali, non-alkaline earth metal salt which is water-insoluble in said slurry and adding a reducing agent to the slurry to convert the water-insoluble metal salt into a compound which is soluble in said slurry.

13. The process of claim 1 wherein the metal of said metal salt is a transition metal.

14. The process of claim 13 wherein the transition metal is selected from the group consisting of iron, copper, cobalt, nickel, manganese, silver, titanium, cerium, lead, chromium, vanadium, molybdenum, tungsten, chromium, osmium and selenium.

15. The process of claim 14 wherein the metal is iron.

16. The process of claim 1 wherein said metal salt is ferrous sulfate or ferrous ammonium sulfate.

17. The process of claim 1 comprising adding a metal chelate to said slurry.

18. The process of claim 17 comprising forming the metal chelate by reacting said metal salt with a chelating agent.

19. The process of claim 18 wherein said chelating agent is selected from the group consisting of pentasodium diethylenetriaminepentaacetic acid, ethylene diaminetetraacetic acid, tetrasodium ethylenediaminetetraacetic acid, tetraammonium ethylenediaminetetraacetic acid, disodium ethylenediaminetetraacetic acid, diammonium ethylenediaminetetraacetic acid, tetrasodium diethylenetriaminepentaacetic acid, trisodium N-(hydroxyethyl)-ethylenediaminetriacetic acid, and triethanolamine.

20. The process of claim 19 further comprising combining the metal salt or metal chelate with an anti-foaming wetting agent and then adding the combination to the slurry.

21. The process of claim 1 wherein the slurry has a concentration of paper in the range of from about 1 to 15% by weight.

22. The process of claim 1 comprising conducting the process at a temperature of from about 25° to 100° C. at a pH of from about 3 to 13.

* * * * *

UNITED STATES PATENT AND TRADEMARK OFFICE
CERTIFICATE OF CORRECTION

PATENT NO. : 5,447,602
DATED : September 5, 1995
INVENTOR(S) : Jerome S. Sajbel, James R. Heyward, Jr., Paul E. Share, Stephen A. Fischer It is certified that error appears in the above-indentified patent and that said Letters Patent is hereby corrected as shown below:

On the cover page, at item 75, Inventors: for "Share", read --Paul E. Share--.

Signed and Sealed this

Seventh Day of November, 1995

Attest:

BRUCE LEHMAN

*Attesting Officer*  *Commissioner of Patents and Trademarks*